US008878105B2

(12) United States Patent
Yamaguchi et al.

(10) Patent No.: US 8,878,105 B2
(45) Date of Patent: Nov. 4, 2014

(54) STEAM COOKER

(75) Inventors: Kiyoshi Yamaguchi, Yamatokoriyama (JP); Yuko Nakajima, Nara (JP); Noriko Ohashi, Osaka (JP); Mari Terada, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 1484 days.

(21) Appl. No.: 11/659,137

(22) PCT Filed: Jul. 28, 2005

(86) PCT No.: PCT/JP2005/013867
§ 371 (c)(1),
(2), (4) Date: Feb. 1, 2007

(87) PCT Pub. No.: WO2006/013784
PCT Pub. Date: Feb. 9, 2006

(65) Prior Publication Data
US 2009/0007798 A1 Jan. 8, 2009

(30) Foreign Application Priority Data

Aug. 2, 2004 (JP) ................. 2004-225426

(51) Int. Cl.
*A47J 27/04* (2006.01)
*A47J 27/16* (2006.01)
*F24C 15/32* (2006.01)
*A21B 3/04* (2006.01)

(52) U.S. Cl.
CPC ............. *F24C 15/327* (2013.01); *A21B 3/04* (2013.01)
USPC ............. 219/401; 219/413; 99/331

(58) Field of Classification Search
CPC ................. A21B 3/04; F24C 15/327

USPC .......... 99/327–333, 403–418, 483, 444–450; 219/400, 401, 430, 433, 413; 126/20, 126/369; 426/511, 523
See application file for complete search history.

(56) References Cited

U.S. PATENT DOCUMENTS 6,133,558 A * 10/2000 Ueda et al. ............... 219/682
6,232,587 B1 * 5/2001 Kurita et al. .............. 219/682
7,105,786 B2 * 9/2006 Kanzaki et al. ........... 219/682

(Continued)

FOREIGN PATENT DOCUMENTS

EP 1372358 A1 * 12/2003
JP 57-77803 A 5/1982

(Continued)

*Primary Examiner* — Jianying Atkisson
(74) *Attorney, Agent, or Firm* — Birch, Stewart, Kolasch & Birch, LLP

(57) ABSTRACT

After a preheating operation is performed to raise an inner temperature of a heating chamber to a target preheating temperature (first specified temperature) by a first steam superheater of a steam temperature-raising device, a cooking operation is performed to raise, by the first steam superheater of the temperature-raising device, a temperature of steam obtained by heating of water in a steam generator by heaters 42A, 42B of the steam generator and then supply the steam to the heating chamber. In this process, when inner temperature of the heating chamber detected by an inner temperature sensor 81 during the preheating operation has come to or beyond a steam generation start temperature (second specified temperature) which is lower than a target preheating temperature, a control unit 80 decides that a steam generation start condition has been satisfied, and heats water in the steam generator by the heaters of the steam generator.

9 Claims, 10 Drawing Sheets

(56) References Cited

U.S. PATENT DOCUMENTS

| | | |
|---|---|---|
| 2003/0167823 A1 | 9/2003 | Gruhbaum et al. |
| 2003/0230569 A1 | 12/2003 | Kanzaki et al. |
| 2004/0232140 A1 | 11/2004 | Kanzaki et al. |

FOREIGN PATENT DOCUMENTS

| | | |
|---|---|---|
| JP | 8-49854 A | 2/1996 |
| JP | 2001-263668 A | 9/2001 |
| JP | 2002-327922 A | 11/2002 |
| JP | 2002-364852 A | 12/2002 |
| JP | 2003-307310 A | 10/2003 |
| JP | 2003-329246 A | 11/2003 |
| JP | 2003-336846 A | 11/2003 |
| JP | 2004-11994 A | 1/2004 |
| JP | 2004-20005 A | 1/2004 |
| JP | 2004-347150 A | 12/2004 |
| JP | 2005-61669 A | 3/2005 |

* cited by examiner

STEAM COOKER

TECHNICAL FIELD

This invention relates to a steam cooker.

BACKGROUND ART

Heretofore, as a steam cooker for cooking an object to be heated such as food by using steam, there is a one that feeds superheated steam into an oven (see JP 8-49854 A). This steam cooker has a steam generator in which a heater is provided in a pot to generate steam, and a steam superheater that generates superheated steam by heating the steam generated by the steam generator, and the superheated steam generated by the steam superheater is sent into the oven to cook food.

With this steam cooker, cooking by steam is carried out by first performing preheating operation for raising the inner temperature of a heating chamber to a specified temperature, thereafter with the cooking object set into the heating chamber, switching the operation mode to a cooking operation so that steam generated by the steam generator is heated by the steam superheater and supplied to the heating chamber. However, with this steam cooker, since the heater of the steam generator is turned on after the switching to the cooking operation, it takes time for the water temperature in the steam generator to rise, causing a slow start-up of the steam supply to the interior of the heating chamber, disadvantageously.

SUMMARY OF THE INVENTION

An object of this invention is, therefore, to provide a steam cooker which is capable of promptly starting steam supply to a heating chamber upon switching from preheating operation to cooking operation so that the cooking time can be shortened, and which yields a good cooking finish.

In order to accomplish the above object, a steam cooker according to the present invention comprises:

a steam generator for generating steam by heating water by a heater;

a heating chamber for heating an object to be heated by steam supplied from the steam generator;

a temperature-raising device for raising an inner temperature of the heating chamber by a heater; and a control unit for controlling the heater of the steam generator and the heater of the temperature-raising device in a fashion that a preheating operation is performed to raise the inner temperature of the heating chamber by the heater of the temperature-raising device to a target preheating temperature, and thereafter a cooking operation is performed to raise, by the heater of the temperature-raising device, a temperature of the steam obtained by the heating of the water in the steam generator by the heater of the steam generator and then supply the steam to the heating chamber, wherein the control unit, when deciding that a steam generation start condition has been satisfied during the preheating operation, heats the water in the steam generator by the heater of the steam generator.

In the steam cooker of this constitution, the temperature of steam from the steam generator is raised by the heater of the temperature-raising device, and the temperature-raised steam is supplied to the heating chamber to heat an object to be heated such as food. In this cooking, at the beginning of the cooking, a preheating operation is performed to heat the inside of the heating chamber to a target preheating temperature by heating by the heater of the temperature-raising device without setting the object in the heating chamber. The control unit, deciding that the steam generation start condition has been satisfied during the preheating operation, heats the water in the steam generator by the heater of the steam generator to generate steam. Then, after the inside of the heating chamber has come to the target preheating temperature with the preheating operation completed, a cooking operation is performed to heat, by the heater of the temperature-raising device, the steam obtained by the heating of the water in the steam generator by the heater of the steam generator and supply the steam to the heating chamber. In this way, preliminarily heating the water in the steam generator during the preheating operation makes it possible to promptly start the steam supply to the heating chamber when switching from a preheating operation to the next cooking operation. Thus, a steam cooker that allows the cooking time to be shortened and that secures a good finish of cooking can be realized.

In one embodiment, the control unit, when deciding that a steam generation reduction condition has been satisfied during the preheating operation after generating steam from the steam generator by heating by the heater of the steam generator upon decision that the steam generation start condition has been satisfied during the preheating operation, controls the heater of the steam generator so as to lower a steam generation amount of the steam generator below a current steam generation amount.

In the steam cooker of this embodiment, the control unit, deciding that the steam generation start condition has been satisfied during the preheating operation, generates steam from the steam generator by heating by the heater of the steam generator. Thereafter, when it is decided by the control unit that the steam generation reduction condition has been satisfied during the preheating operation, the control unit controls the heater of the steam generator to lower the steam generation amount of the steam generator below a current steam generation amount. Thus, the consumption amount of water in the steam generator during the preheating operation until the next cooking operation can be reduced while the water in the steam generator is kept warm. In this case, the control for the heater of the steam generator may be done by controlling power applied to one heater to larger or smaller one, or by turning on and off the power, or by controlling the applied power or performing the on/off control on a combination of a plurality of heaters.

One embodiment further comprises a temperature sensor for detecting an inner temperature of the heating chamber, wherein the control unit decides that the steam generation start condition has been satisfied when the inner temperature of the heating chamber detected by the temperature sensor during the preheating operation has come to or beyond a steam generation start temperature which is lower than the target preheating temperature.

In the steam cooker of this embodiment, when the inner temperature of the heating chamber detected by the temperature sensor during the preheating operation has come to or beyond the steam generation start temperature which is lower than the target preheating temperature, the control unit decides that the steam generation start condition has been satisfied, and generates steam from the steam generator by heating by the heater of the steam generator. Thus, before the inner temperature of the heating chamber comes to the target preheating temperature, i.e., before the preheating is completed, the water is heated by the heater of the steam generator, so that the water in the steam generator can be heated at the completion of preheating.

One embodiment further comprises
a temperature sensor for detecting an inner temperature of the heating chamber, wherein
the control unit decides that the steam generation start condition has been satisfied when the inner temperature of the heating chamber detected by the temperature sensor during the preheating operation has come to or beyond the target preheating temperature.

In the steam cooker of this embodiment, when the inner temperature of the heating chamber detected by the temperature sensor during the preheating operation has come to or beyond the target preheating temperature, the control unit decides that the steam generation start condition has been satisfied, and generates steam from the steam generator by heating by the heater of the steam generator. Thus, after the inner temperature of the heating chamber has come to the target preheating temperature with the preheating completed, the water is heated by the heater of the steam generator, so that the operation mode can be moved to the heating operation promptly at the time when the water in the steam generator has heated.

One embodiment further comprises
a temperature sensor for detecting an inner temperature of the heating chamber, wherein
the control unit,
when the inner temperature of the heating chamber detected by the temperature sensor during the preheating operation has come to or beyond a steam generation start temperature which is lower than the target preheating temperature, decides that the steam generation start condition has been satisfied, and heats the water in the steam generator by the heater of the steam generator, and
thereafter, when the inner temperature of the heating chamber detected by the temperature sensor during the preheating operation has come to or beyond the target preheating temperature, decides that the steam generation reduction condition has been satisfied, and controls the heater of the steam generator so as to lower a steam generation amount of the steam generator below a current steam generation amount.

In the steam cooker of this embodiment, when the inner temperature of the heating chamber detected by the temperature sensor during the preheating operation has come to or beyond the target preheating temperature, the control unit deciding that the steam generation reduction condition has been satisfied, and controls the heater of the steam generator to lower the steam generation amount below a current steam generation amount. Thus, by using, as the steam generation reduction condition, a condition that the inner temperature of the heating chamber comes to a target preheating temperature during the preheating operation, how the water in the steam generator has been heated can be controlled depending on the time elapsing until the temperature in the heating chamber changes from a steam generation start temperature to the target preheating temperature, so that heater control for the steam generator can be simplified.

In one embodiment, the control unit decides that the steam generation reduction condition has been satisfied when a specified time has elapsed since the heating of the water in the steam generator by the heater of the steam generator after deciding that the steam generation start condition has been satisfied during the preheating operation.

In the steam cooker of this embodiment, when a specified time has elapsed since the heating of the water in the steam generator by the heater of the steam generator upon decision by the control unit that the steam generation start condition has been satisfied during the preheating operation, the control unit decides that the steam generation reduction condition has been satisfied, and controls the heater of the steam generator to lower the steam generation amount below a current steam generation amount. Thus, by using, as the steam generation reduction condition, a condition that a specified time has elapsed since the generation of the steam from the steam generator during the preheating operation, how the water in the steam generator has been heated can be controlled depending on time control, so that heater control for the steam generator can be simplified.

One embodiment further comprises
a water temperature sensor for detecting a temperature of water in the steam generator, wherein
the control unit decides that the steam generation reduction condition has been satisfied when the temperature of the water in the steam generator detected by the water temperature sensor has come to or beyond a specified temperature.

In the steam cooker of this embodiment, when the temperature of the water in the steam generator detected by the water temperature sensor has come to or beyond the specified temperature after the generation of the steam from the steam generator by heating by the heater of the steam generator upon decision by the control unit that the steam generation start condition has been satisfied during the preheating operation, the control unit decides that the steam generation reduction condition has been satisfied, and controls the heater of the steam generator to lower the steam generation amount of the steam generator below a current steam generation amount. Thus, by using, as the steam generation reduction condition, a condition that the temperature of the water in the steam generator has come to or beyond the specified temperature after the generation of the steam from the steam generator during the preheating operation, how the water in the steam generator has been heated can be easily and securely grasped and controlled, so that heater control for the steam generator can be fulfilled more accurately.

One embodiment further comprises
notification means for, when the control unit decides that the steam generation reduction condition has been satisfied during the preheating operation, notifying a user that the preheating operation has been completed.

In the steam cooker of this embodiment, when it is decided by the control unit that the steam generation reduction condition has been satisfied during the preheating operation, the user is notified by the notification means of the completion of the preheating operation, the user can be notified of the completion of the preheating operation without delay. Thus, the user is allowed to start the cooking operation after setting a food, which is the object to be cooked, into the heating chamber, so that the workability of cooking can be improved. In addition, preferably, a display device or sound source is used as the notification means for the notification of completion of the preheating operation.

As apparent from the above description, according to the steam cooker of the present invention, steam supply to the heating chamber can promptly be started when switching from preheating operation to cooking operation. Thus, a steam cooker that allows the cooking time to be shortened and that secures a good finish of cooking can be realized.

DETAILED DESCRIPTION OF THE INVENTION

Figure 1:
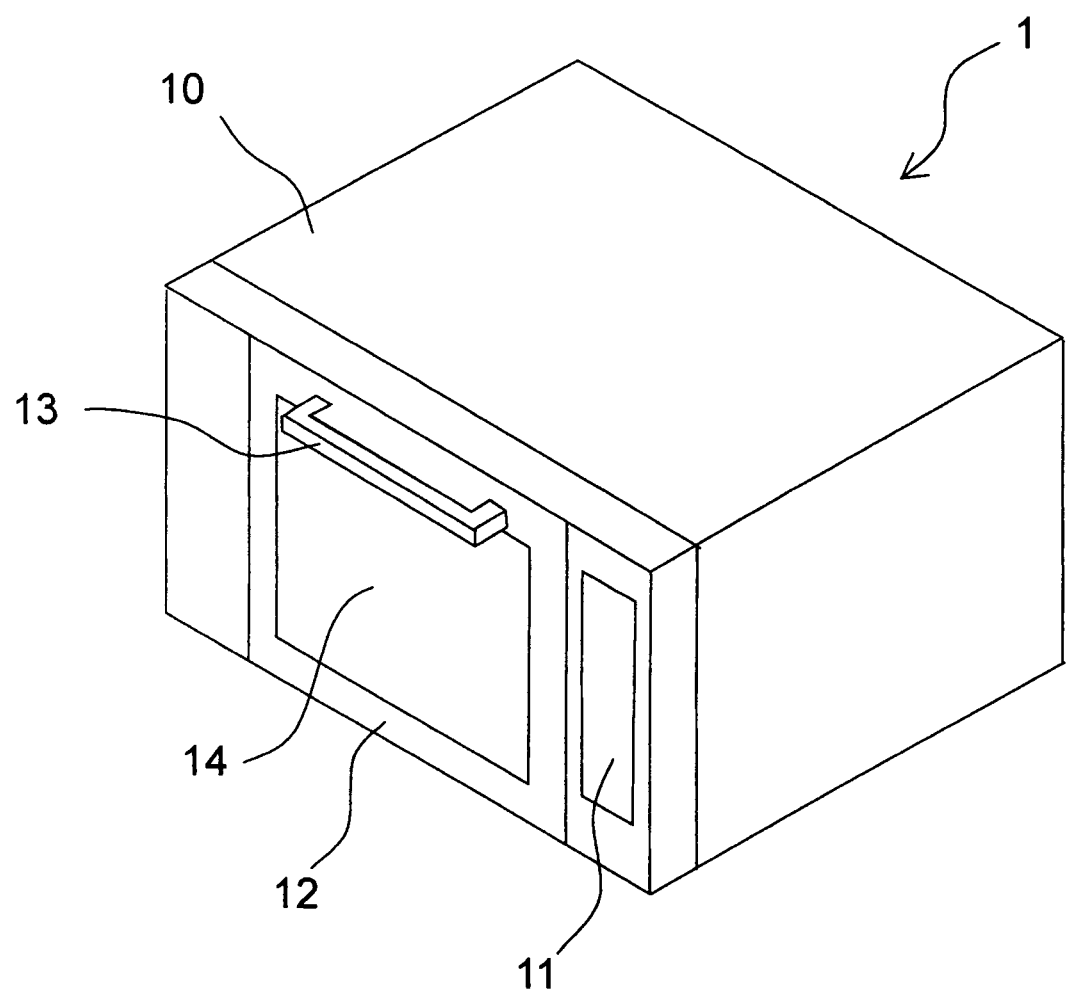
FIG. 1 is a perspective view showing an external appearance of a steam cooker according to a first embodiment of the invention.

The steam cooker of the invention will be described using examples shown in the drawings.

First Embodiment

FIG. 1 is an external perspective view of a steam cooker 1 according to a first embodiment of the invention, where a door 12 that pivots roughly about a lower end side is provided in a front face of a rectangular parallelepiped cooker casing 10. An operation panel 11 is provided on the right side of the door 12, a handle 13 is provided at an upper portion of the door 12, and a heat-resistant glass window 14 is provided at a roughly center of the door 12.

Figure 2:
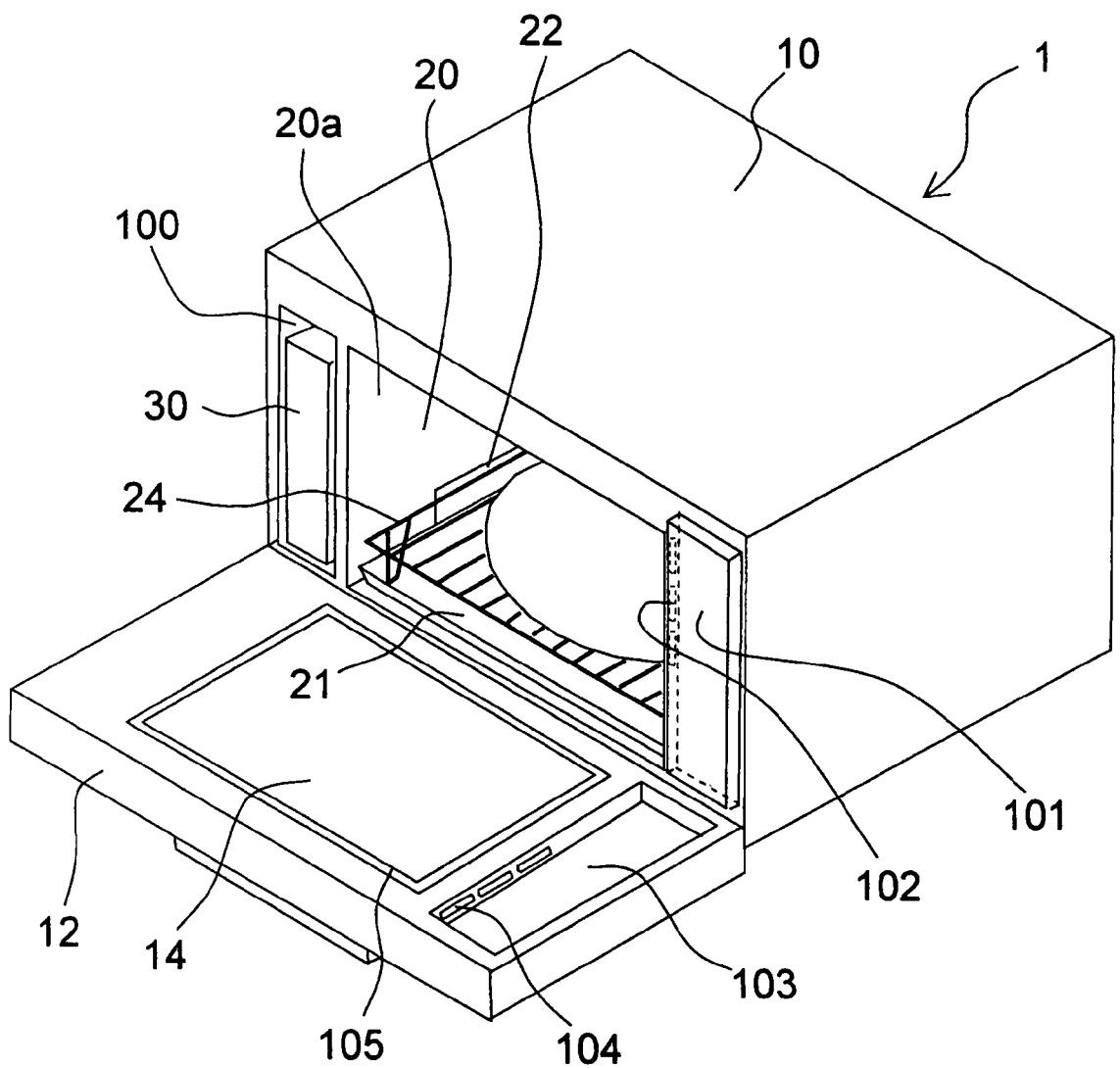
FIG. 2 is a perspective view showing an external appearance of the steam cooker with its door opened.

FIG. 2 shows an external perspective view of the steam cooker 1 with its door 12 opened, where a rectangular parallelepiped-shaped heating chamber 20 is provided within the cooker casing 10. The heating chamber 20 has an opening 20a on its front side facing the door 12, and side surfaces, a bottom surface and a top surface of the heating chamber 20 are formed of a stainless steel plate. Also, one side of the door 12 facing the heating chamber 20 is formed of a stainless steel plate. Then, a heat insulating material (not shown) is placed around the heating chamber 20 and inside the door 12, by which the interior of the heating chamber 20 is thermally insulated from the outside.

A stainless steel-made catch pan 21 is placed at the bottom surface of the heating chamber 20, and a stainless steel wire-made rack 24 for receiving an object to be cooked is placed on the catch pan 21. Further, side steam outlets 22 of a roughly rectangular shape, which are longitudinally roughly level (only one of the openings is shown in FIG. 2), are provided at both lateral side surface surfaces of the heating chamber 20. With the door 12 opened, the top surface side of the door 12 is roughly level, allowing the cooking object to be once placed on the top surface of the door 12 for takeout of the cooking object.

Also, a water tank housing 100 for housing a water tank 30 is provided on the left side of the heating chamber 20 of the cooker casing 10. Protruding portions 101 are provided so as to protrude in the front face in a roughly rectangular shape on the right side of the heating chamber 20 of the cooker casing 10, and a plurality of air holes 102 are provided on upper one side of the protruding portions 101 closer to the heating chamber 20.

Further, recessed portions 103 into which the protruding portions 101 of the cooker casing 10 are fitted with the door 12 closed are provided in the door 12. In a side wall of the recessed portion 103 closer to the window 14, a plurality of cooling slits 104 as an example of air inlet ports are provided at positions where those are opposed to the plurality of air holes 102 of the protruding portions 101 of the cooker casing 10. The window 14 is formed of two heat-resistant glasses having a space interposed therebetween, and a packing 105 is attached to an outer edge of the window 14 on its one side facing the cooker casing 10 of the door 12.

Figure 3:
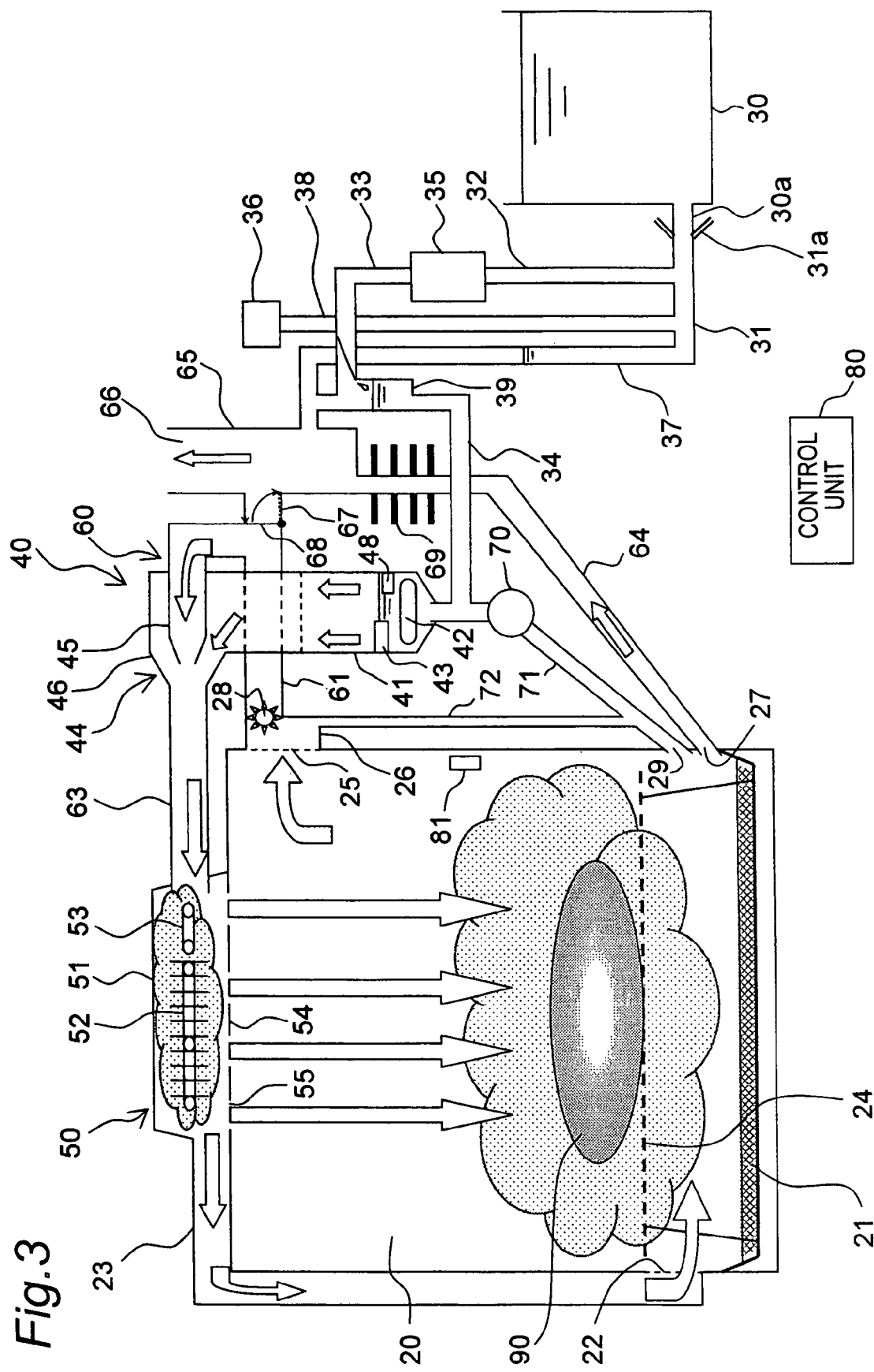
FIG. 3 is a schematic sectional view of main part of the steam cooker with its door closed, as viewed sideways.

FIG. 3 is a schematic configurational view showing the basic construction of the steam cooker 1. As shown in FIG. 3, the steam cooker 1 includes the heating chamber 20, a water tank 30 for storing water for steam, a steam generator 40 for evaporating water supplied from the water tank 30, a steam temperature-raising device 50 which is an example of a temperature-raising device for heating steam from the steam generator 40 and a control unit 80 for controlling the steam generator 40, the steam temperature-raising device 50 and other devices. A rack 24 is also mounted on the catch pan 21 placed in the heating chamber 20, and an object 90 to be cooked is placed at a roughly center of the rack 24.

A connecting portion 30a provided at the lower side of the water tank 30 is connected to a funnel-like receiving port 31a provided at one end of a first water supply pipe 31. The suction side of a pump 35 is connected to an end of a second water supply pipe 32, which branches off from the first water supply pipe 31 and extends upward, and one end of a third water supply pipe 33 is connected to the discharge side of the pump 35. A water level sensor 36 for the water tank is provided at an upper end portion of a pipe 38 for the water level sensor, which pipe branches off from the first water supply pipe 31 and extends upward. Further, an upper end portion of an air releasing pipe 37 that branches off from the first water supply pipe 31 and extends upward is connected to a later-described exhaust gas duct 65.

Then, the third water supply pipe 33 has an L shape in which a horizontal portion that is bent roughly horizontally from a vertically placed portion and an auxiliary tank 39 is connected to the other end of the third water supply pipe 33. One end of a fourth water supply pipe 34 is connected to a lower end of the auxiliary tank 39, and the other end of the fourth water supply pipe 34 is connected to a lower end of the steam generator 40. One end of a drain valve 70 is connected to the lower end of the steam generator 40, to which the fourth water supply pipe 34 is connected. One end of a drain pipe 71 is connected to the other end of the drain valve 70, and an inner drain port 29 is connected to the other end of the drain pipe 71. The drain pipe 71 is connected to the inner drain port 29 so as to project by 2 mm or more into the heating chamber 20. Further, an upper end of a drain pipe 72 is connected to a lowermost portion of a fan casing 26, and a lower end of the drain pipe 72 is connected to the drain pipe 71. It is noted that an upper portion of the auxiliary tank 39 communicates with the atmosphere via the air releasing pipe 37 and the exhaust gas duct 65.

Once the water tank 30 has been connected, water in the water tank 30 rises in the air releasing pipe 37 until its water level reaches the same water level as that of the water tank 30. Since a tip of the pipe 38 for the water level sensor connected to the water level sensor 36 for the water tank is sealed, the water level in the pipe 38 does not rise, but a pressure in a sealed space in the pipe 38 for the water level sensor increases from an atmospheric pressure, depending on the water level of the water tank 30. This pressure change is detected by a pressure detection device (not shown) in the water level sensor 36 for the water tank, whereby the water level in the water tank 30 is detected. Although water level measurement does not require the air releasing pipe 37 while the pump 35 is stationary, the air releasing pipe 37 having an open end is used in order to prevent deterioration of accuracy in the detection of the water level of the water tank 30 due to direct application of a suction pressure of the pump 35 to the pressure detection device.

The steam generator 40 has a pot 41, to a lower side of which the other end of the fourth water supply pipe 34 is connected, a heater 42 placed in the vicinity of a bottom surface in the pot 41, a water level sensor 43 placed in the vicinity of the upper side of the heater 42 in the pot 41, a steam suction ejector 44 attached to the upper side of the pot 41, and a water temperature sensor 48 placed in the pot 41. A fan casing 26 is placed outside an intake opening 25 provided at an upper portion of a lateral side of the heating chamber 20. Steam in the heating chamber 20 is sucked through the intake opening 25 by a blower fan 28 placed in the fan casing 26. The sucked steam is sent to an inlet side of the steam suction ejector 44 of the steam generator 40 via a first pipe 61. One end of the first pipe 61 is connected to the fan casing 26, and the other end thereof is connected to the inlet side of an inner nozzle 45 of the steam suction ejector 44.

The steam suction ejector 44 is provided with an outer nozzle 46 that covers an outer side of the inner nozzle 45, and the discharge side of the inner nozzle 45 communicates with an internal space of the pot 41. The discharge side of the outer nozzle 46 of the steam suction ejector 44 is connected to one end of a second pipe 63 and the steam temperature-raising device 50 is connected to the other end of the second pipe 63.

The fan casing 26, the first pipe 61, the steam suction ejector 44, the second pipe 63 and the steam temperature-raising device 50 form an circulation passage 60. One end of a discharge passage 64 is connected to a discharge port 27 provided in a lower portion of the lateral side of the heating chamber 20, and the other end of the discharge passage 64 is connected to one end of the exhaust gas duct 65. The other end of the exhaust gas duct 65 is provided with an exhaust gas outlet 66. A radiator 69 is outwardly fitted to the exhaust gas duct 65 side of the discharge passage 64. A connection portion with the first pipe 61 to form the circulation passage 60 is connected to the exhaust gas duct 65 through an exhaust gas passage 67. At the connection side of the exhaust gas passage 67 with the first pipe 61, the exhaust gas passage 67 is provided with a damper 68 that opens or closes the exhaust gas passage 67.

The steam temperature-raising device 50 includes a tray-shaped case 51 placed with its opening downward on a ceiling side at a roughly central portion of the heating chamber 20, a first steam superheater 52 placed in the tray-shaped case 51, and a second steam superheater 53 placed in the tray-shaped case 51. A bottom of the tray-shaped case 51 is formed of a metallic ceiling panel 54 serving as a ceiling plane of the heating chamber 20. The ceiling panel 54 is formed with a plurality of ceiling steam outlets 55. Both upper and lower surfaces of the ceiling panel 54 give a dark color by coating and the like. The ceiling panel 54 may also be formed of a metal material that turns into a dark color by repetitive use or a dark ceramic molded product.

One end of each of steam supply passages 23 (in FIG. 3, only one of them is shown), which extend to the left and right sides of the heating chamber 20, is connected to the steam temperature-raising device 50. The other end of each of the steam supply passages 23 extends downward along the side surfaces of the heating chamber 20 and is connected to side steam outlets 22, each of which is provided in a lower position of the lateral side of the heating chamber 20.

Figure 4:
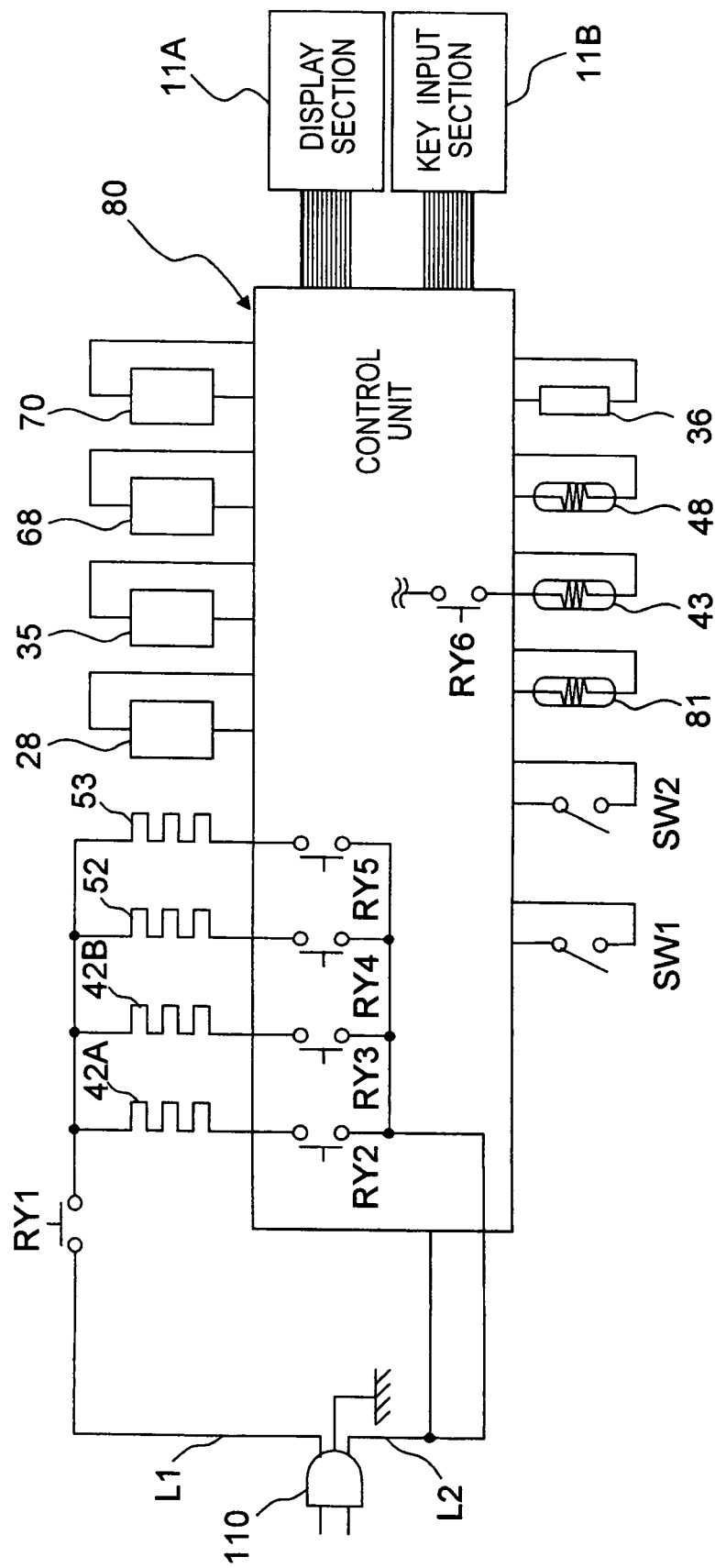
FIG. 4 is a view showing a configuration of a control unit of the steam generator.

FIG. 4 shows the configuration of the control unit 80 of the steam cooker 1. As shown in FIG. 4, connected to the control unit 80 are the blower fan 28, the first steam superheater 52, the second steam superheater 53, the damper 68, the drain valve 70, a first steam generation heater 42A, a second steam generation heater 42B, a display section 11A as an example of notification means, a key input section 11B, the water level sensor 36 for the water tank, the water level sensor 43, the water temperature sensor 48, an inner temperature sensor 81 for detecting a temperature in the heating chamber 20 (shown in FIG. 3), a humidity sensor (not shown) for detecting a humidity in the heating chamber 20, and the pump 35. The display section 11A and the key input section 11B constitute the operation panel 11 (shown in FIG. 1). Further connected to the control unit 80 are a door opening/closing detection switch SW1 and a tank mount detection switch SW2. The door opening/closing detection switch SW1 turns on when the door 12 is open, and turns off when the door 12 is closed. The tank mount detection switch SW2 turns on when the tank 30 shown in FIG. 2 is mounted in the water tank housing 100, and turns off when not.

The control unit 80 shown in FIG. 4 includes a microcomputer, an input/output circuit and the like. Based on detection signals received from the water level sensor 36 for the water tank, the water level sensor 43, the water temperature sensor 48, the inner temperature sensor 81, the humidity sensor, the door opening/closing detection switch SW1 and the tank mount detection switch SW2, the control unit 80 controls the blower fan 28, the first steam superheater 52, the second steam superheater 53, the damper 68, the drain valve 70, the first steam generation heater 42A, the second steam generation heater 42B, the display section 11A, the key input section 11B and the pump 35 according to a specified program.

Also, as shown in FIG. 4, one output terminal L2 of a receptacle 110, to which utility AC power supply (not shown) is connected, is connected to one power supply input terminal of the control unit 80, while the other output terminal L1 of the receptacle 110 is connected to one end of a heating relay RY1. Connected to the other end of the heating relay RY1 is one end of each of the first steam generation heater 42A, the second steam generation heater 42B, the first steam superheater 52 and the second steam superheater 53. Further, the other end of the first steam generation heater 42A is connected to one end of a relay RY2, and the other end of the second steam generation heater 42B is connected to one end of a relay RY3. The other end of the first steam superheater 52 is connected to one end of a relay RY4, and the other end of the second steam superheater 53 is connected to one end of a relay RY5. The other ends of the relays RY2-RY5 are connected to the one output terminal L2 of the receptacle 110. The water level sensor 43 is a self-heated thermistor, the turn-on and -off of which is controlled by a relay RY6.

Figure 5:
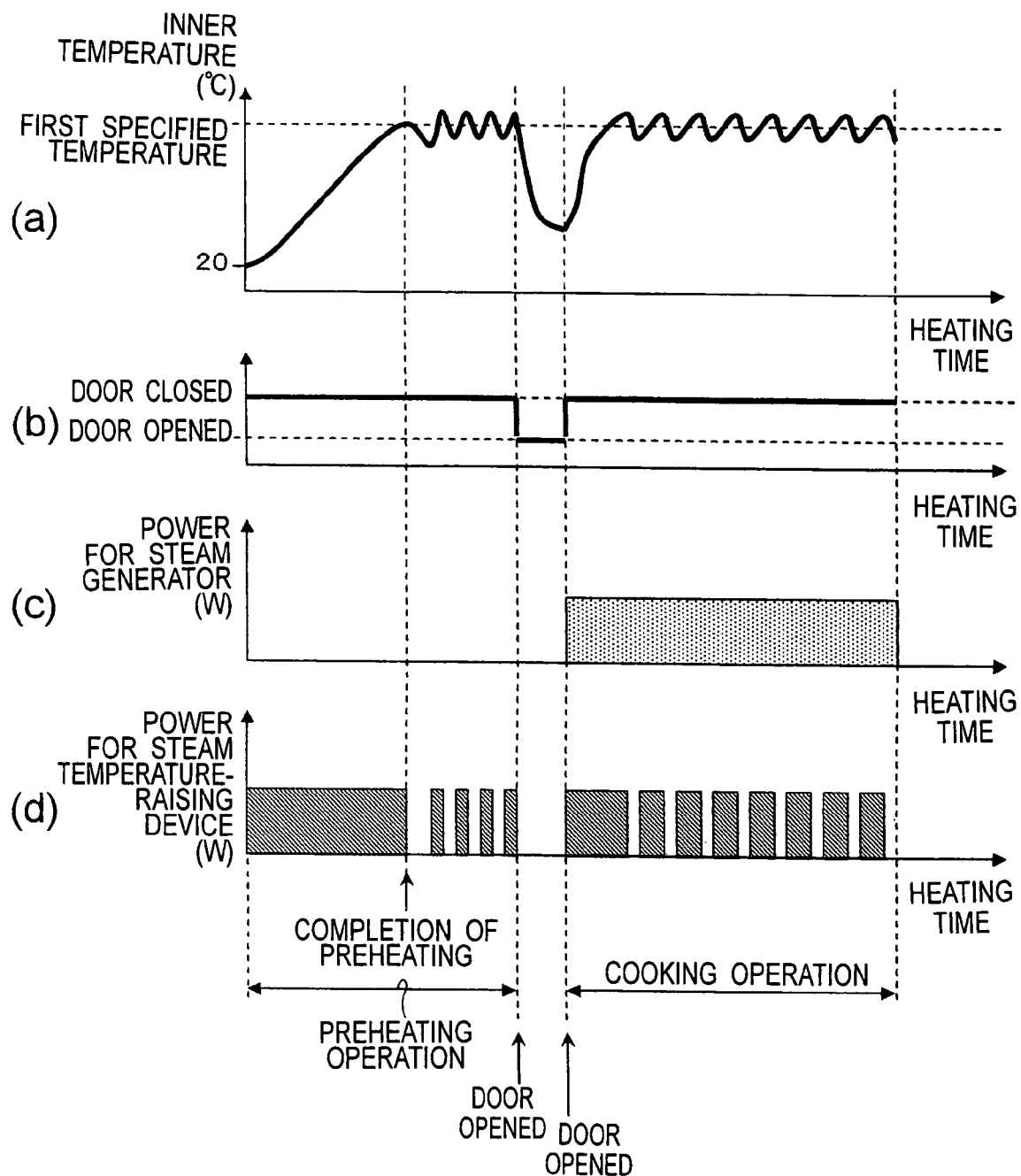
FIG. 5 is a view for explaining cooking process by a steam cooker in a comparative example.

Next, before cooking process with the steam cooker 1 of the first embodiment of the invention is described, a comparative example showing operating statuses of cooking process is described with reference to FIG. 5. FIG. 5(a) shows variations in the inner temperature (° C.) of the heating chamber 20 in cooking process by steam, FIG. 5(b) shows opening/closing of the door 12, FIG. 5(c) shows a change in power (W) applied to the steam generator 40 (heater 42), and FIG. 5(d) shows changes in power (W) applied to the steam temperature-raising device 50 (first steam superheater 52). In FIGS. 5(a)-5(d), the horizontal axis represents heating time. It is noted that the steam cooker with which the cooking processing shown in FIGS. 5(a)-5(d) is performed is given only for a comparison with the embodiment of the invention, and is not a steam cooker of the invention.

In this cooking by steam, a preheating operation mode for raising the inner temperature of the heating chamber 20 to a target preheating temperature (e.g., 200° C.) is first performed without setting therein the object to be cooked such as food, and after completion of the preheating, the operation mode is moved to a cooking operation mode in which cooking by steam is performed with the object to be cooked set in the heating chamber 20.

First, upon a start of the preheating operation mode, operation of the blower fan 28 is started, and as shown in FIG. 5(d), the first steam superheater 52 of the steam temperature-raising device 50 is turned on. Then, by the blower fan 28, air sucked via the intake opening 25 from within the heating chamber 20 is circulated along the circulation passage 60 via the steam generator 40 and the steam temperature-raising device 50, so that the inner temperature of the heating chamber 20 rises gradually.

Next, when the inner temperature of the heating chamber 20 reaches a first specified temperature, which is the target preheating temperature, the preheating is completed, and afterwards the first steam superheater 52 of the steam temperature-raising device 50 is turned on or off so that the inner temperature of the heating chamber 20 is maintained at the first specified temperature.

Next, as shown in FIG. 5(b), when a user, after once opening the door 12 and setting the food into the heating chamber 20, closes the door 12, the cooking operation mode starts. Then, in the cooking operation mode, water stored in the pot 41 is heated by turning on the heater 42 of the steam generator 40 while the first steam superheater 52 of the steam temperature-raising device 50 is controlled so as to be turned on and Off so that the inner temperature of the heating chamber 20 is maintained at the first specified temperature.

In this case, it takes time from when the cooking operation mode is started after the end of the preheating operation until when steam is generated from the steam generator 40. As a result, until enough steam is generated, dry air circulates in the heating chamber 20 and along the circulation passage 60 so that the food in the heating chamber 20 is dried, resulting in a poor finish of cooking.

Figure 6:
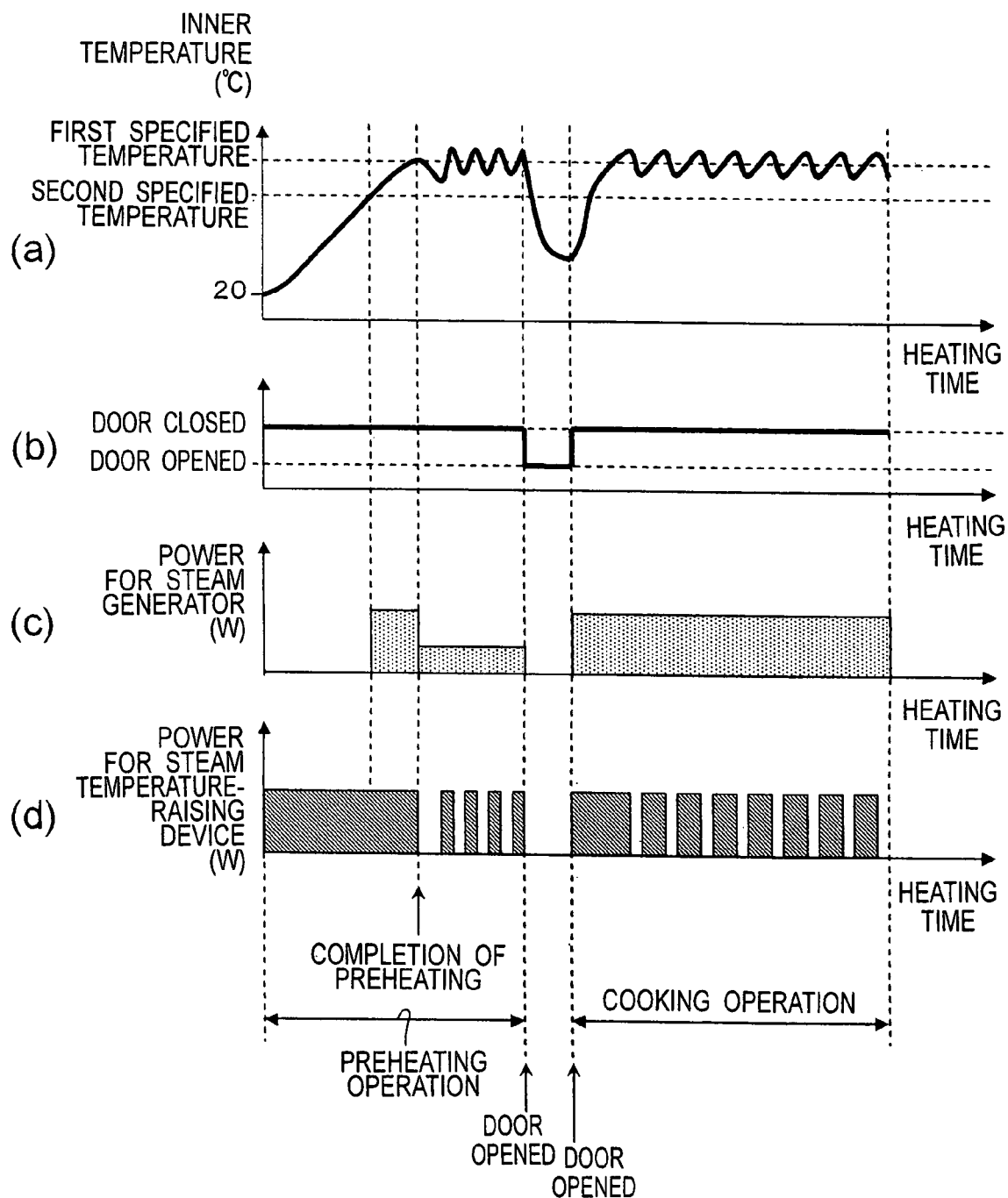
FIG. 6 is a view for explaining cooking process by the steam cooker of the first embodiment.

In contrast to this, in the steam cooker 1 of the first embodiment of the invention, cooking process shown in FIG. 6 is performed. FIG. 6(a) shows variations in the inner temperature (° C.) of the heating chamber 20 in cooking process, FIG. 6(b) shows opening/closing of the door 12, FIG. 6(c) shows changes in power (W) applied to the steam generator 40 (heater 42), and FIG. 6(d) shows changes in power (W) applied to the steam temperature-raising device 50 (first steam superheater 52). In FIGS. 6(a)-6(d), the horizontal axis represents heating time.

Hereinbelow, cooking process on the steam cooker 1 of this first embodiment will be described in detail.

First, a power switch (not shown) on the operation panel 11 is pushed to power up, and a cooking operation by steam is started by an operation of the operation panel 11.

Then, upon start of the preheating operation mode, the control unit 80 closes the drain valve 70, and starts to operate the pump 35 in a state in which the exhaust gas passage 67 is closed by the damper 68. Water is supplied by the pump 35 from the water tank 30 into the pot 41 of the steam generator 40 via the first through fourth water supply pipes 31-34. Then, when the water level sensor 43 detects that the water level in the pot 41 has reached a predetermined level, the control unit 80 stops the pump 35 to stop water supply.

Subsequently, the blower fan 28 is turned on, and, at the same time, the first steam superheater 52 of the steam temperature-raising device 50 is turned on as shown in FIG. 6(d). Then, the blower fan 28 sucks air (including steam) in the heating chamber 20 through the intake openings 25 and sends the air (including steam) to the circulation passage 60. Since a centrifugal fan is used as the blower fan 28, it is possible to generate a higher pressure than with a propeller fan. Furthermore, the centrifugal fan used as the blower fan 28 is rotated at a high speed by a DC motor, whereby a flow rate of the circulating airflow can be highly increased.

Then, by the heating by the first steam superheater 52 of the steam temperature-raising device 50, as shown in FIG. 6(a), the inner temperature of the heating chamber 20 gradually rises, where when the inner temperature detected by the inner temperature sensor 81 comes to or beyond a second specified temperature (e.g., 180° C.) lower than the first specified temperature (e.g., 200° C.) that is the target preheating temperature, the control unit 80, deciding that a steam generation start condition has been satisfied, turns on the heater 42 of the steam generator 40 so that a specified amount of water stored in the pot 41 is heated by the heater 42.

Next, as shown in FIG. 6(a), when the inner temperature of the heating chamber 20 detected by the inner temperature sensor 81 becomes not less than the first specified temperature that is the target preheating temperature, the control unit 80, deciding that a steam generation reduction condition has been satisfied, lowers the power applied to the heater 42 of the steam generator 40 as shown in FIG. 6(c) so that the steam generation amount is lowered below a current steam generation amount. Also, after the steam generation reduction condition is satisfied, the control unit 80, deciding that the preheating has been completed, turns on or off the first steam superheater 52 to maintain the inner temperature of the heating chamber 20 at the first specified temperature. In this case, the heater 42 keeps heating by the first steam generation heater 42A of large power (e.g., 700 W) and the second steam generation heater 42B of small power (e.g., 300 W) until the steam generation reduction condition is satisfied, and then after the satisfaction of the steam generation reduction condition, performs heating only by the second steam generation heater 42B of small power (e.g., 300 W), thus achieving a reduction of the power to be applied to the heater 42.

Next, as shown in FIG. 5(b), when the user opens the door 12 to set the food into the heating chamber 20, the heater 42 of the steam generator 40 and the first steam superheater 52 of the steam temperature-raising device 50 are turned off.

Then, the control unit 80, detecting an opening of the door 12 by means of the door opening/closing detection switch SW1 (shown in FIG. 4), instantaneously opens the damper 68 of the exhaust gas passage 67. As a result, the first pipe 61 of the circulation passage 60 communicates with the exhaust gas duct 65 via the exhaust gas passage 67, so that steam in the heating chamber 20 is discharged by the blower fan 28 from the exhaust gas outlet 66 via the intake openings 25, the first pipe 61, the exhaust gas passage 67 and the exhaust gas duct 65.

Next, when the door 12 is closed again, the control unit 80, starting the cooking operation mode, turns on the heater 42 so that the water in the pot 41 is heated by the heater 42. In doing this, the control unit 80 concurrently performs power control for the first steam superheater 52 to maintain the inner temperature of the heating chamber 20 at the first specified temperature.

When the water in the pot 41 of the steam generator 40 comes to 100° C. to boil, saturated steam is generated, and this saturated steam merges with a circulating airflow passing through the circulation passage 60 at a point of the steam suction ejector 44. The steam coming out from the steam suction ejector 44 flows into the steam temperature-raising device 50 at high speed via the second pipe 63. Then, the steam flowing into the steam temperature-raising device 50 is heated by the first steam superheater 52 to be superheated steam. A part of the superheated steam is jetted downward into the heating chamber 20 from the plurality of ceiling steam outlets 55 provided in the lower ceiling panel 54. Another part of the superheated steam is jetted from the side steam outlets 22 in both of the lateral sides of the heating chamber 20 via the steam supply passages 23, which extend to the left and right sides of the steam temperature-raising device 50.

Thus, superheated steam jetted from the ceiling side of the heating chamber 20 is vigorously supplied to the centrally placed object 90 side. Also, superheated steam jetted from the left and right lateral sides of the heating chamber 20 is supplied in a manner so as to wrap the object 90, while going up from the lower side of the object 90. As a result, a convective superheated steam flow, in which steam blows down into a central portion and ascends in its outer side, is generated in the heating chamber 20. The convective superheated steam flow repeats a cycle of being sucked into the intake openings 25, passing the circulation passage 60 and returning to the inside of the heating chamber 20 again.

In this manner, by forming a convective superheated steam flow in the heating chamber 20, it becomes possible to jet superheated steam, which is sent from the steam temperature-raising device 50, from the ceiling steam outlets 55 and the side steam outlets 22 so that it efficiently collides with the object 90 placed on the rack 24, while maintaining uniform temperature, humidity distribution in the heating chamber 20. Then, collision of superheated steam heats the object 90. At this time, superheated steam in contact with a surface of the object 90 heats the object 90 also by releasing latent heat that is generated when building up condensation on the surface of the object 90. Thus, a large quantity of heat can uniformly be imparted to the entire surface of the object 90 surely and promptly. Therefore, uniform cooking that secures a good finish can be realized.

In the cooking operation, an amount of steam in the heating chamber 20 increases with a lapse of time, and an excess amount of steam is discharged outside from the exhaust gas outlet 66 via the discharge port 27, the discharge passage 64 and the exhaust gas duct 65. At this time, a radiator 69 provided on the discharge passage 64 cools steam passing the discharge passage 64 to form condensation, whereby steam is prevented from being discharged to the outside as such. Water condensed by the radiator 69 within the discharge passage 64 runs down the discharge passage 64, is led to the catch pan 21, and disposed of together with water generated by cooking after completion of the cooking.

After completion of the cooking, the control unit 80 displays a message of completion of the cooking on the operation panel 11, and a sound is raised by a buzzer (not shown) provided on the operation panel 11. A user who has been noticed thereby of the completion of the cooking opens the door 12. Then, the control unit 80, detecting the opening of the door 12 by means of the door opening/closing detection switch SW1 (shown in FIG. 4), instantaneously opens the damper 68 of the exhaust gas passage 67. Thus, the first pipe 61 of the circulation passage 60 communicates with the exhaust gas duct 65 via the exhaust gas passage 67, so that steam in the heating chamber 20 is discharged by the blower fan 28 from the exhaust gas outlet 66 via the intake openings 25, the first pipe 61, the exhaust gas passage 67 and the exhaust gas duct 65. The operation of the damper is the same even if the user opens the door 12 while cooking. Therefore, the user can safely take out the object 90 from the inside of the heating chamber 20 without being exposed to steam.

As shown above, in the cooking with the preheating operation of the steam cooker 1 of the first embodiment, during the preheating operation that the inside of the heating chamber 20 is brought to the target preheating temperature (first specified temperature) by heating with the first steam superheater 52 of the steam temperature-raising device 50 without setting the object to be cooked in the heating chamber 20, the control unit 80, deciding that the steam generation start condition has been satisfied, heats the water in the pot 41 of the steam generator 40 by means of the heater 42 of the steam generator 40 to generate steam. Then, after the inside of the heating chamber 20 has come to the target preheating temperature (first specified temperature) and preheating operation has been completed, the control unit 80 performs the cooking operation that steam obtained by heating of the water inside the steam generator 40 by the heater 42 of the steam generator 40 is raised in temperature by the first steam superheater 52 of the steam temperature-raising device 50 and supplied to the heating chamber 20. In this manner, preliminarily heating the water in the steam generator 40 during the preheating operation makes it possible to promptly start the steam supply to the heating chamber 20 upon a switch from a preheating operation to the next cooking operation. Thus, a steam cooker that allows the cooking time to be shortened and that secures a good finish of cooking can be realized.

Also, in the steam cooker 1, when the inner temperature of the heating chamber 20 detected by the inner temperature sensor 81 during preheating operation has gone beyond the target preheating temperature (first specified temperature), the control unit 80, deciding that the steam generation reduction condition has been satisfied, controls the heater 42 of the steam generator 40 to lower the steam generation amount of the steam generator 40 below a current steam generation amount. Thus, by using, as the steam generation reduction condition, a condition that the inner temperature of the heating chamber 20 comes to a target preheating temperature (first specified temperature) during the preheating operation, how the water in the steam generator 40 has been heated can be controlled depending on a time elapse until the temperature in the heating chamber 20 changes from a steam generation start temperature (second specified temperature) to the target preheating temperature (first specified temperature), so that heater control for the steam generator 40 can be simplified.

Second Embodiment

Figure 7:
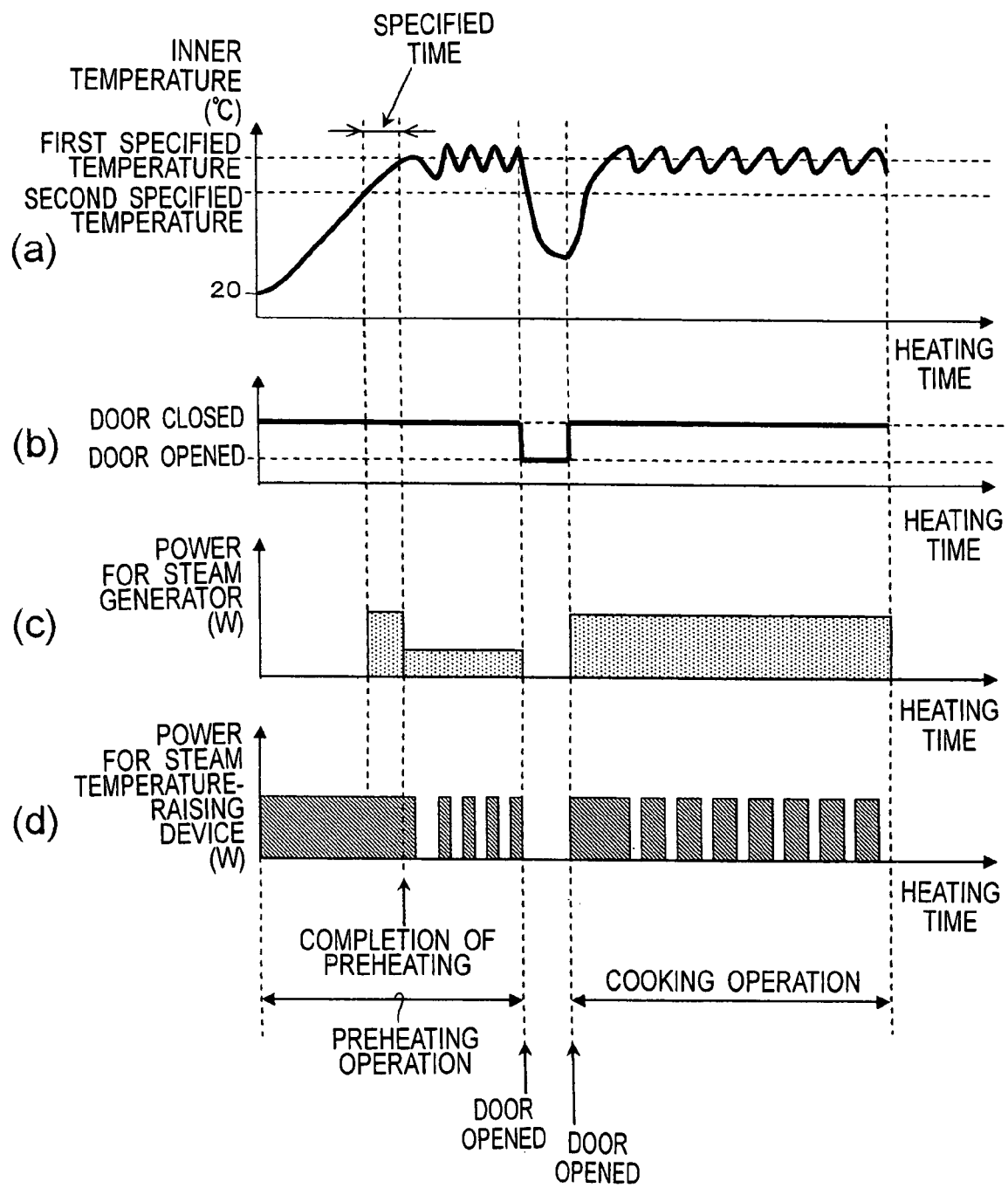
FIG. 7 is a view for explaining cooking process in a second embodiment of the invention.

FIG. 7 is a view for explaining cooking process with preheating operation by a steam cooker which is a second embodiment of the invention. The steam cooker of this second embodiment is similar in construction to the steam cooker of the first embodiment except the control for cooking process, and so the explanation of the construction is omitted by common reference to FIGS. 1 to 4.

FIG. 7(a) shows variations in the inner temperature (° C.) of the heating chamber 20 in cooking process, FIG. 7(b) shows opening/closing of the door 12, FIG. 7(c) shows changes in power (W) applied to the steam generator 40 (heater 42), and FIG. 7(d) shows changes in power (W) applied to the steam temperature-raising device 50 (first steam superheater 52). In FIGS. 7(a)-7(d), the horizontal axis represents heating time.

In the steam cooker of this second embodiment, as in the case of the steam cooker of the first embodiment, the inner temperature of the heating chamber 20 is gradually raised as shown in FIG. 7(a) by heating with the first steam superheater 52 of the steam temperature-raising device 50. Then, when the inner temperature detected by the inner temperature sensor 81 comes to or beyond a second specified temperature (e.g., 180° C.) that is a steam generation start temperature lower than the first specified temperature (e.g., 200° C.) that is the target preheating temperature, the control unit 80 decides that a steam generation start condition has been satisfied. Accordingly, the control unit 80 turns on the heater 42 of the steam generator 40 so that water in the pot 41 is heated by the heater 42.

Then, as shown in FIG. 7(*a*), when a specified time (e.g., 40 to 60 sec.) has elapsed since the time point that the steam generation start condition is satisfied, the control unit 80 decides that a steam generation reduction condition has been satisfied. Accordingly, the control unit 80 lowers the power applied to the heater 42 of the steam generator 40 as shown in FIG. 7(*c*) to lower the steam generation amount below a current steam generation amount.

Also, after the satisfaction of the steam generation start condition, when the inner temperature of the heating chamber 20 has come to the first specified temperature, the control unit 80 decides that the preheating has been completed, and turns on and off the first steam superheater 52 of the steam temperature-raising device 50 to maintain the inner temperature of the heating chamber 20 at the first specified temperature.

Thus, in the steam cooker 1 of the second embodiment, preliminarily heating the water in the steam generator 40 during the preheating operation makes it possible to promptly start the steam supply to the heating chamber 20 when switching from a preheating operation to the next cooking operation. Thus, a steam cooker that allows the cooking time to be shortened and that secures a good finish of cooking can be realized.

Also, the control unit 80, deciding that the steam generation reduction condition has been satisfied in the preheating operation, controls the heater 42 of the steam generator 40 so that the steam generation amount of the steam generator 40 is lowered below a current steam generation amount. Thus, the consumption amount of water in the steam generator 40 during the preheating operation until the next cooking operation can be reduced while the water in the steam generator 40 is kept warm.

Further, in this steam cooker 1, when the inner temperature of the heating chamber 20 detected by the inner temperature sensor 81 during preheating operation has gone beyond the steam generation start temperature (second specified temperature) lower than the target preheating temperature (first specified temperature), the control unit 80, deciding that the steam generation start condition has been satisfied, allows steam to be generated from the steam generator 40. Thus, the water in the pot 41 is heated by the heater 42 of the steam generator 40 before the temperature in the heating chamber 20 comes to the target preheating temperature (before the preheating is completed), so that the water in the steam generator 40 can be preliminarily heated at the completion of preheating.

Further, by using, as the steam generation reduction condition, a condition that a specified time has elapsed since the start of heating of the water in the pot 41 by the heater 42 of the steam generator 40 in the preheating operation, how the water in the steam generator 40 has been heated can be controlled depending on time control, so that heater control for the steam generator 40 can be simplified.

Third Embodiment

Figure 8:
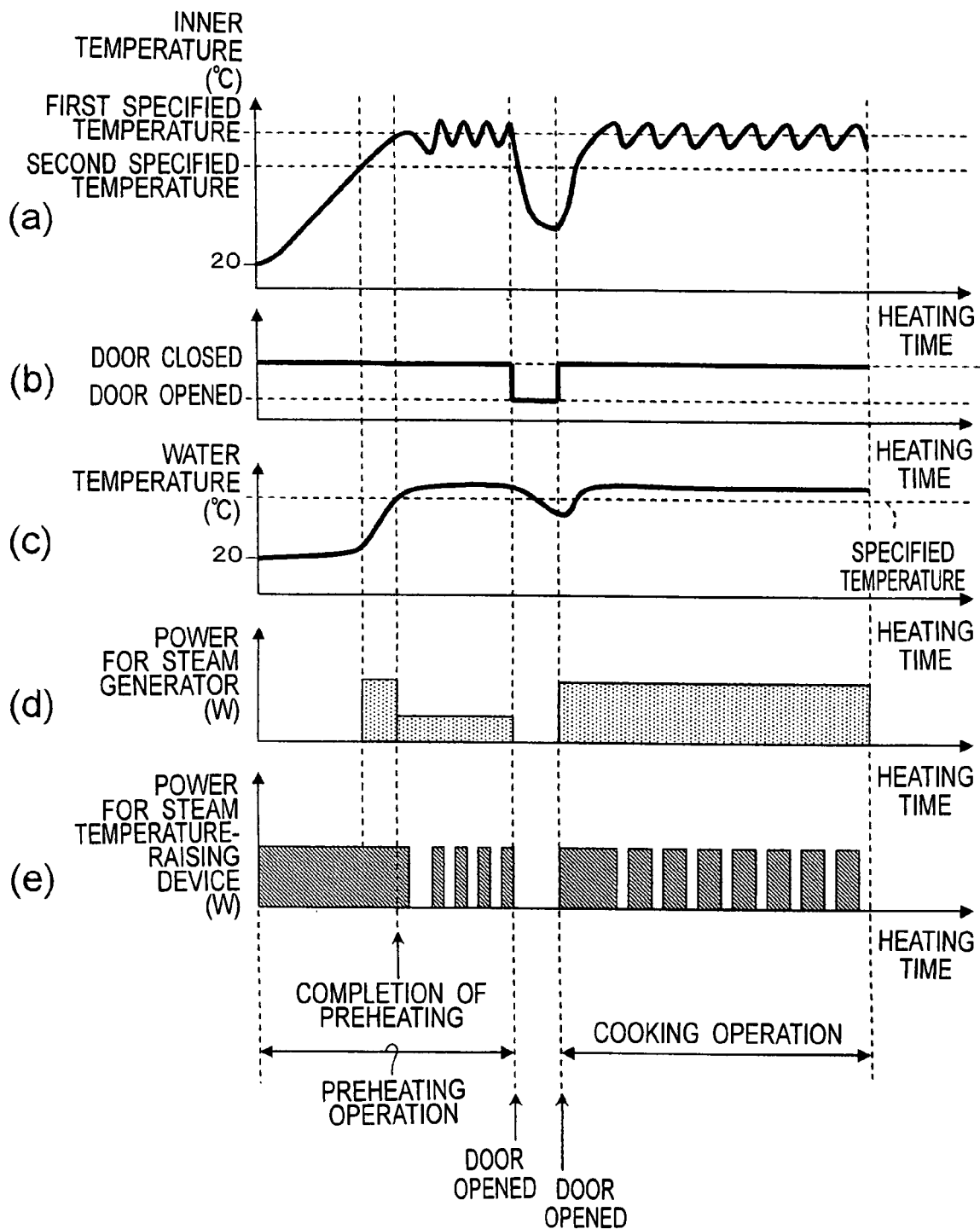
FIG. 8 is a view for explaining cooking process in a third embodiment of the invention.

FIG. 8 is a view for explaining cooking process with preheating operation by a steam cooker which is a third embodiment of the invention. The steam cooker of this third embodiment is similar in construction to the steam cooker of the first embodiment except the control for cooking process, and so the explanation of construction is omitted by common reference to FIGS. 1 to 4.

FIG. 8(*a*) shows variations in the inner temperature (° C.) of the heating chamber 20 in cooking process, FIG. 8(*b*) shows opening/closing of the door 12, FIG. 8(*c*) shows variations in water temperature (° C.) in the pot 41 of the steam generator 40, FIG. 8(*d*) shows changes in power (W) applied to the steam generator 40 (heater 42), and FIG. 8(*e*) shows changes in power (W) applied to the steam temperature-raising device 50 (first steam superheater 52). In FIGS. 8(*a*)-8(*e*), the horizontal axis represents heating time.

In the steam cooker of this third embodiment, as in the case of the steam cooker of the first embodiment, the inner temperature of the heating chamber 20 is gradually raised as shown in FIG. 8(*a*) by heating with the first steam superheater 52 of the steam temperature-raising device 50 in the preheating operation mode. Then, when the inner temperature detected by the inner temperature sensor 81 comes to or beyond a second specified temperature (e.g., 180° C.) that is a steam generation start temperature lower than the first specified temperature (e.g., 200° C.) that is the target preheating temperature, the control unit 80 decides that a steam generation start condition has been satisfied. Thus, as shown in FIG. 8(*d*), the control unit 80 turns on the heater 42 of the steam generator 40 so that water in the pot 41 is heated by the heater 42.

Then, as shown in FIG. 8(*c*), when the water temperature in the pot 41 of the steam generator 40 detected by the water temperature sensor 48 (shown in FIG. 4) has come a specified temperature or higher, the control unit 80 decides that the steam generation reduction condition has been satisfied. Thus, as shown in FIG. 8(*d*), the control unit 80 lowers the power applied to the heater 42 of the steam generator 40 to lower the steam generation amount below a current steam generation amount.

Also, after the satisfaction of the steam generation start condition, when the inner temperature of the heating chamber 20 has come to the first specified temperature, the control unit 80 decides that the preheating has been completed, and turns on and off the first steam superheater 52 of the steam temperature-raising device 50 to maintain the inner temperature of the heating chamber 20 at the first specified temperature.

Therefore, in the steam cooker 1 of this third embodiment, preliminarily heating the water in the steam generator 40 during the preheating operation makes it possible to promptly start the steam supply to the heating chamber 20 when switching from a preheating operation to the next cooking operation. Thus, a steam cooker that allows the cooking time to be shortened and that secures a good finish of cooking can be realized.

Also, the control unit 80, when deciding that the steam generation reduction condition has been satisfied in the preheating operation, controls the heater 42 of the steam generator 40 to lower the steam generation amount of the steam generator 40 below a current steam generation amount. Thus, the consumption amount of water in the steam generator 40 during the preheating operation until the next cooking operation can be reduced while the water in the steam generator 40 is kept warm.

Further, in this steam cooker 1, when the inner temperature of the heating chamber 20 detected by the inner temperature sensor 81 during preheating operation has gone beyond the steam generation start temperature (second specified temperature) lower than the target preheating temperature (first specified temperature), the control unit 80, deciding that the steam generation start condition has been satisfied, allows steam to be generated from the steam generator 40. Thus, the water in the pot 41 is heated by the heater 42 of the steam generator 40 before the temperature in the heating chamber 20 comes to the target preheating temperature (before the preheating is completed), so that the water in the steam generator 40 can be preliminarily heated at the completion of preheating.

Further, by using, as the steam generation reduction condition, a condition that the temperature of water in the steam generator 40 becomes not less than a specified temperature since the heating of the water in the pot 41 by the heater 42 of the steam generator 40 in the preheating operation, how the water in the steam generator 40 has been heated can be easily and securely grasped and controlled, so that heater control for the steam generator 40 can be fulfilled more accurately.

Fourth Embodiment

Figure 9:
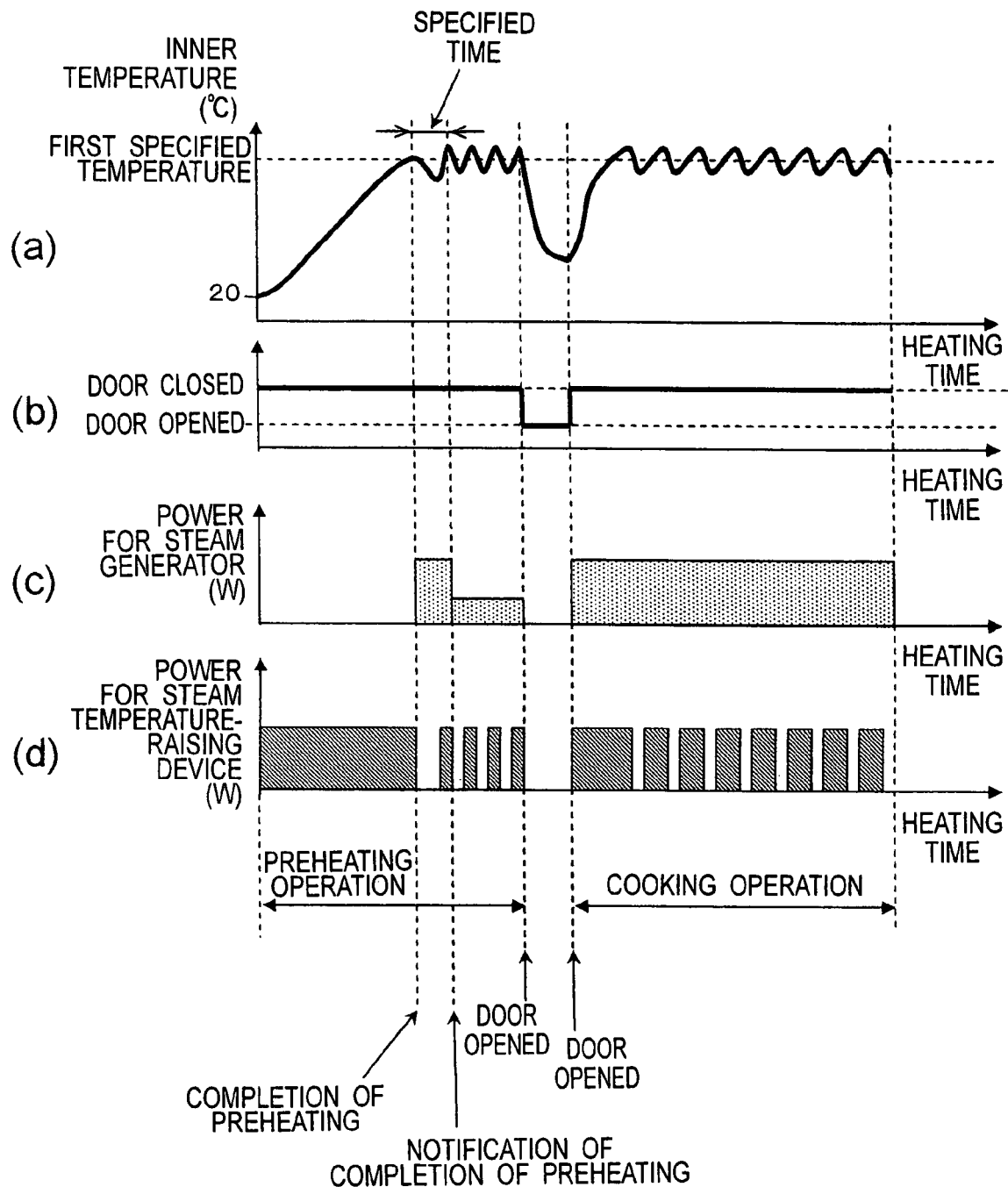
FIG. 9 is a view for explaining cooking process in a fourth embodiment of the invention.

FIG. 9 is a view for explaining cooking process with preheating operation by a steam cooker which is a fourth embodiment of the invention. The steam cooker of this fourth embodiment is similar in construction to the steam cooker of the first embodiment except the control for cooking process, and so the explanation of construction is omitted by common reference to FIGS. 1 to 4.

FIG. 9(a) shows variations in the inner temperature (° C.) of the heating chamber 20 in cooking process, FIG. 9(b) shows opening/closing of the door 12, FIG. 9(c) shows changes in power (W) applied to the steam generator 40 (heater 42), and FIG. 9(d) shows changes in power (W) applied to the steam temperature-raising device 50 (first steam superheater 52). In FIGS. 9(a)-9(d), the horizontal axis represents heating time.

In the steam cooker of this fourth embodiment, the inner temperature of the heating chamber 20 is gradually raised as shown in FIG. 9(a) by heating with the first steam superheater 52 of the steam temperature-raising device 50 in the preheating operation mode. Then, when the inner temperature detected by the inner temperature sensor 81 comes to or beyond a first specified temperature (e.g., 200° C.) that is the target preheating temperature, the control unit 80 decides that the preheating has been completed and that a steam generation start condition has been satisfied. Thus, the control unit 80 turns on the heater 42 of the steam generator 40 so that the water in the pot 41 is heated by the heater 42.

Then, as shown in FIG. 9(a), when a specified time (e.g., 40 to 60 sec.) has elapsed since the time point that the steam generation start condition is satisfied, the control unit 80 decides that a steam generation reduction condition has been satisfied. Accordingly, the control unit 80 lowers the power applied to the heater 42 of the steam generator 40 as shown in FIG. 9(c) to lower the steam generation amount below a current steam generation amount. Also, when the steam generation reduction condition is satisfied, the control unit 80 notifies the user of the completion of the preheating.

Also, after the satisfaction of the steam generation start condition, the control unit 80 turns on and off the first steam superheater 52 of the steam temperature-raising device 50 to maintain the inner temperature of the heating chamber 20 at the first specified temperature.

The notification of the completion of preheating is done by displaying a message of completion of the preheating on the display section 11A (shown in FIG. 4) of the operation panel 11 (shown in FIG. 1) and further producing an alarm sound by a buzzer (not shown) provided on the operation panel 11.

Therefore, in the steam cooker 1 of the fourth embodiment, preliminarily heating the water in the steam generator 40 during the preheating operation makes it possible to promptly start the steam supply to the heating chamber 20 when switching from a preheating operation to the next cooking operation. Thus, a steam cooker that allows the cooking time to be shortened and that secures a good finish of cooking can be realized.

Also, the control unit 80, when deciding that the steam generation reduction condition has been satisfied in the preheating operation, controls the heater 42 of the steam generator 40 to lower the steam generation amount of the steam generator 40 below a current steam generation amount. Thus, the consumption amount of water in the steam generator 40 during the preheating operation until the next cooking operation can be reduced while the water in the steam generator 40 is kept warm.

Further, in this steam cooker 1, when the inner temperature of the heating chamber 20 detected by the inner temperature sensor 81 during preheating operation has gone beyond a target preheating temperature, the control unit 80, deciding that the steam generation start condition has been satisfied, allows steam to be generated from the steam generator 40 by heating with the heater 42 of the steam generator 40. Thus, the water in the pot 41 is heated by the heater 42 of the steam generator 40 after the temperature in the heating chamber 20 has come to the target preheating temperature with the preheating completed. Therefore, at a time point when the water in the steam generator 40 has been heated, the inner temperature of the heating chamber 20 has already come to the target preheating temperature, allowing the operation mode to be promptly moved to heating operation.

Further, by using, as the steam generation reduction condition, a condition that a specified time has elapsed since the start of heating of the water in the pot 41 by the heater 42 of the steam generator 40 in the preheating operation, how the water in the steam generator 40 has been heated can be controlled depending on time control, so that heater control for the steam generator 40 can be simplified.

Further, in the steam cooker 1, the control unit 80, when deciding that the steam generation reduction condition has been satisfied during the preheating operation, notifies the user of completion of the preheating operation by means of the display section 11A and the buzzer. Thus, the user can be notified of the completion of the preheating operation without delay. As a result, the user is allowed to start the cooking operation after setting a food, which is the object to be cooked, into the heating chamber 20, so that the workability of cooking can be improved.

Fifth Embodiment

Figure 10:
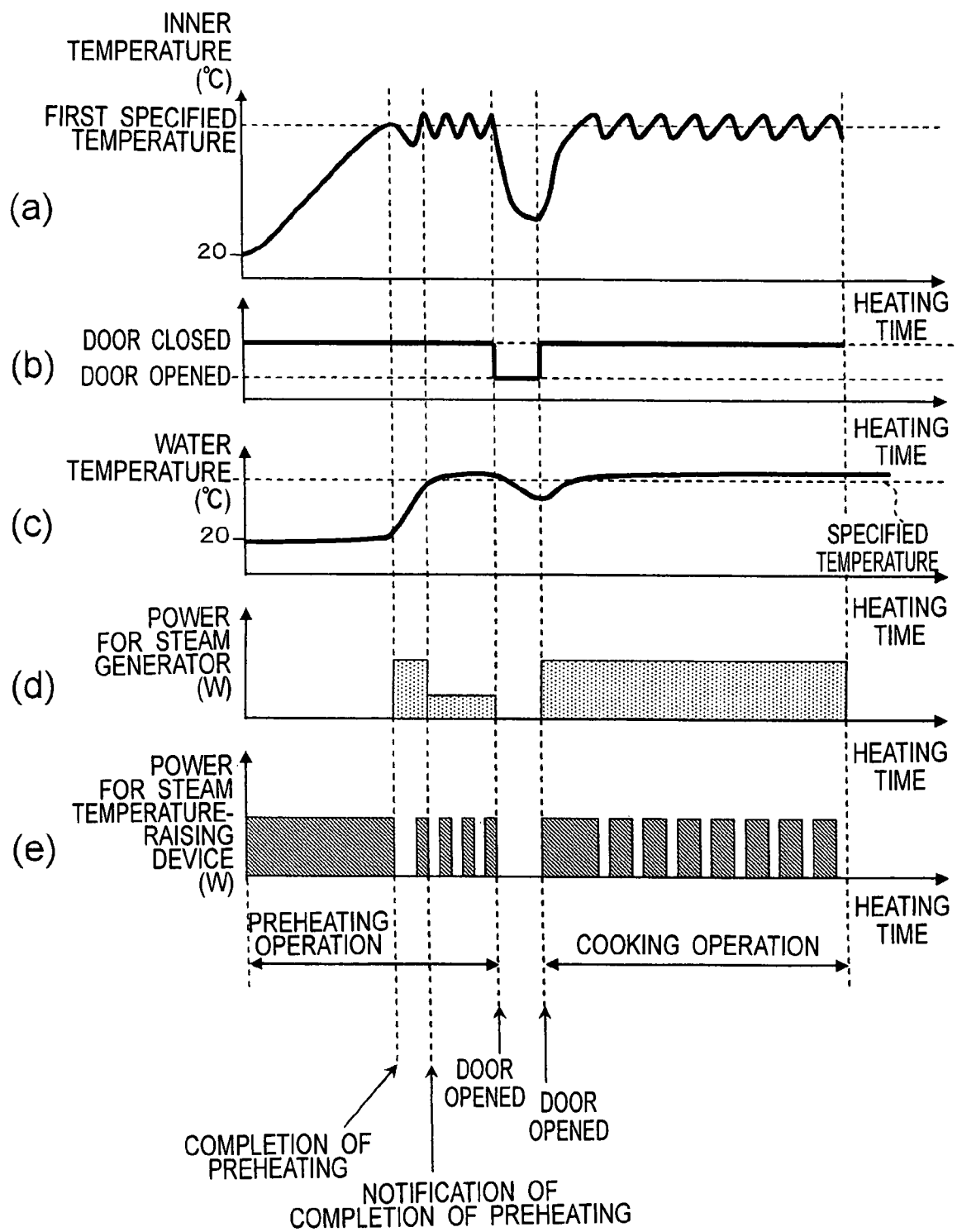
FIG. 10 is a view for explaining cooking process in a fifth embodiment of the invention.

FIG. 10 is a view for explaining cooking process with preheating operation by a steam cooker which is a fifth embodiment of the invention. The steam cooker of this fifth embodiment is similar in construction to the steam cooker of the first embodiment except the control for cooking process, and so the explanation of construction is omitted by common reference to FIGS. 1 to 4.

FIG. 10(a) shows variations in the inner temperature (° C.) within the heating chamber 20 in cooking process, FIG. 10(b) shows opening/closing of the door 12, FIG. 10(c) shows variations in the water temperature (° C.) in the pot 41 of the steam generator 40, FIG. 10(d) shows changes in power (W) applied to the steam generator 40 (heater 42), FIG. 10(e) shows changes in power (W) applied to the steam temperature-raising device 50 (first steam superheater 52). In FIGS. 10(a)-10(e), the horizontal axis represents heating time.

In the steam cooker of this fifth embodiment, the inner temperature of the heating chamber 20 is gradually raised as shown in FIG. 10(*a*) by heating with the first steam superheater 52 of the steam temperature-raising device 50 in the preheating operation mode. Then, when the inner temperature detected by the inner temperature sensor 81 comes to or beyond a first specified temperature (e.g., 200° C.) that is the target preheating temperature, the control unit 80 decides that the steam generation start condition has been satisfied. Thus, the control unit 80, deciding that the preheating has been completed, turns on the heater 42 of the steam generator 40 so that the water in the pot 41 is heated by the heater 42.

Then, as shown in FIG. 10(*c*), when the water temperature in the pot 41 of the steam generator 40 detected by the water temperature sensor 48 (shown in FIG. 4) comes to or beyond a specified temperature, the control unit 80 decides that the steam generation reduction condition has been satisfied. Thus, the control unit 80 lowers the power applied to the heater 42 of the steam generator 40 as shown in FIG. 10(*d*) to lower the steam generation amount below a current steam generation amount. Also, when the steam generation reduction condition is satisfied, the control unit 80 notifies the user of the completion of the preheating.

Also, after the satisfaction of the steam generation start condition, the control unit 80 turns on and off the first steam superheater 52 of the steam temperature-raising device 50 to maintain the inner temperature of the heating chamber 20 at the first specified temperature.

The notification of the completion of preheating is done by displaying a message of completion of the preheating on the display section 11A (shown in FIG. 4) of the operation panel 11 (shown in FIG. 1) and further producing an alarm sound by a buzzer (not shown) provided on the operation panel 11.

Therefore, in the steam cooker 1 of the fifth embodiment, preliminarily heating the water in the steam generator 40 during the preheating operation makes it possible to promptly start the steam supply to the heating chamber 20 when switching from a preheating operation to the next cooking operation. Thus, a steam cooker that allows the cooking time to be shortened and that secures a good finish of cooking can be realized.

Also, the control unit 80, when deciding that the steam generation reduction condition has been satisfied in the preheating operation, controls the heater 42 of the steam generator 40 to lower the steam generation amount of the steam generator 40 below a current steam generation amount. Thus, the consumption amount of water in the steam generator 40 during the preheating operation until the next cooking operation can be reduced while the water in the steam generator 40 is kept warm.

Further, in this steam cooker 1, when the inner temperature of the heating chamber 20 detected by the inner temperature sensor 81 during preheating operation has gone beyond a target preheating temperature, the control unit 80, deciding that the steam generation start condition has been satisfied, allows steam to be generated from the steam generator 40 by heating with the heater 42 of the steam generator 40. Thus, the water in the pot 41 is heated by the heater 42 of the steam generator 40 after the temperature in the heating chamber 20 has come to the target preheating temperature with the preheating completed. Therefore, at a time point when the water in the steam generator 40 has been heated, the inner temperature of the heating chamber 20 has already come to the target preheating temperature, allowing the operation mode to be promptly moved to heating operation.

Further, by using, as the steam generation reduction condition, a condition that the temperature of water in the steam generator 40 becomes not less than a specified temperature since the heating of the water in the pot 41 by the heater 42 of the steam generator 40 in the preheating operation, how the water in the steam generator 40 has been heated can be easily and securely grasped and controlled, so that heater control for the steam generator 40 can be fulfilled more accurately.

Further, in the steam cooker 1, the control unit 80, when deciding that the steam generation reduction condition has been satisfied during the preheating operation, notifies the user of completion of the preheating operation by means of the display section 11A and the buzzer. Thus, the user can be notified of the completion of the preheating operation without delay. As a result, the user is allowed to start the cooking operation after setting a food, which is the object to be cooked, into the heating chamber 20, so that the workability of cooking can be improved.

In the fourth and fifth embodiments, when it is decided by the control unit 80 that the steam generation reduction condition has been satisfied during the preheating operation, the control unit 80 notifies the user of completion of the preheating operation by notification means (display section 11A and buzzer). Moreover, in the first to third embodiments, when it is decided by the control unit that the steam generation reduction condition has been satisfied during the preheating operation, the control unit may also notify the user of the completion of preheating operation by the notification means.

Furthermore, in the first to fifth embodiments, condensation water generated in the circulation passage 60 is discharged into the heating chamber 20 via the drain passages (drain pipes 71, 72). However, with a discharge tank additionally provided, the condensation water generated in the circulation passages may be discharged to the discharge tank via the drain passages.

Furthermore, in the first to fifth embodiments, description has been made on a steam cooker which includes the steam generator 40, the steam temperature-raising device 50 and the circulation passage 60 and which fulfills the cooking of an object to be cooked by supplying superheated steam to the heating chamber 20. However, the present invention may be applied to any steam cooker only if the steam cooker includes a steam generator for generating steam, i.e., a steam generator for heating water by a heater to generate steam, a heating chamber for heating the object to be cooked by steam supplied from the steam generator, and a steam temperature-raising device for raising the inner temperature in the heating chamber by a heater.

The invention claimed is:

1. A steam cooker, comprising:
   a steam generator for generating steam by heating water by a steam generating heater;
   a heating chamber for heating an object to be heated by steam supplied from the steam generator;
   a temperature-raising device for raising an inner temperature of the heating chamber by a temperature-raising heater; and
   a control unit for controlling the steam generating heater and the temperature-raising heater,
   wherein:
   the control unit firstly operates the temperature-raising heater without operating of the steam generating heater in a preheating operation mode to raise the inner temperature of the heating chamber to a target preheating temperature and maintains the inner temperature of the heating chamber at the target preheating temperature,
   the control unit then supplies a first power to the steam generating heater to heat the water in the steam generator when determining that a steam generation start condition has been satisfied after starting of the operating of the temperature-raising heater during the preheating operation mode, the control unit then repeatedly turns on and off the temperature-raising heater while supplying to the steam generating heater a second power smaller than the first power so as to maintain the inner temperature of the heating chamber at the target preheating temperature when determining that a steam generation reduction condition has been satisfied after supplying the first power during the preheating operation mode, the control unit performs a cooking operation in a cooking operation mode to raise, by the temperature-raising heater, a temperature of the steam obtained by the heating of the water by the steam generating heater to provide heated steam and then supply the heated steam to the heating chamber, where the cooking operation mode is performed after the preheating operation mode, and the second power is an amount of power greater than zero.

2. The steam cooker according to claim 1, further comprising a temperature sensor for detecting an inner temperature of the heating chamber, wherein the control unit determines that the steam generation start condition has been satisfied when the inner temperature of the heating chamber detected by the temperature sensor during the preheating operation has come to or beyond a steam generation start temperature which is lower than the target preheating temperature.

3. The steam cooker according to claim 1, further comprising a temperature sensor for detecting an inner temperature of the heating chamber, wherein the control unit determines that the steam generation start condition has been satisfied when the inner temperature of the heating chamber detected by the temperature sensor during the preheating operation has come to or beyond the target preheating temperature.

4. The steam cooker according to claim 1, further comprising a temperature sensor for detecting an inner temperature of the heating chamber, wherein the control unit, when the inner temperature of the heating chamber detected by the temperature sensor during the preheating operation has come to or beyond a steam generation start temperature which is lower than the target preheating temperature, determines that the steam generation start condition has been satisfied, and heats the water in the steam generator by the steam generating heater, and thereafter, when the inner temperature of the heating chamber detected by the temperature sensor during the preheating operation has come to or beyond the target preheating temperature, determines that the steam generation reduction condition has been satisfied, and controls the steam generating heater so as to reduce the power applied to the steam generating heater.

5. The steam cooker according to claim 2, wherein the control unit determines that the steam generation reduction condition has been satisfied when a specified time has elapsed since the heating of the water in the steam generator by the steam generating heater after determining that the steam generation start condition has been satisfied during the preheating operation.

6. The steam cooker according to claim 2, further comprising a water temperature sensor for detecting a temperature of water in the steam generator, wherein the control unit determines that the steam generation reduction condition has been satisfied when the temperature of the water in the steam generator detected by the water temperature sensor has come to or beyond a specified temperature.

7. The steam cooker according to claim 1, further comprising a notification unit, when the control unit determines that the steam generation reduction condition has been satisfied during the preheating operation, notifying a user that the preheating operation has been completed.

8. The steam cooker according to claim 3, wherein the control unit determines that the steam generation reduction condition has been satisfied when a specified time has elapsed since the heating of the water in the steam generator by the steam generating heater after deciding that the steam generation start condition has been satisfied during the preheating operation.

9. The steam cooker according to claim 3, further comprising a water temperature sensor for detecting a temperature of water in the steam generator, wherein the control unit determines that the steam generation reduction condition has been satisfied when the temperature of the water in the steam generator detected by the water temperature sensor has come to or beyond a specified temperature.

* * * * *